United States Patent [19]

Laster

[11] Patent Number: 4,802,517
[45] Date of Patent: Feb. 7, 1989

[54] TREE CUTTING APPARATUS

[76] Inventor: Pat Laster, P.O. Box 31821, Lafayette, La. 70503

[21] Appl. No.: 191,913

[22] Filed: May 9, 1988

[51] Int. Cl.⁴ ............................................. A01G 23/02
[52] U.S. Cl. .................................. 144/34 E; 144/339; 114/151; 446/211
[58] Field of Search ................... 144/3 D, 34 R, 34 E, 144/336, 339; 239/265.11; 446/211, 215; 114/151

[56] References Cited

U.S. PATENT DOCUMENTS

| | | | |
|---|---|---|---|
| 3,056,267 | 10/1962 | McRee | 144/34 E |
| 3,667,515 | 6/1972 | Corey | 144/34 E |
| 3,880,216 | 4/1975 | Anderson | 144/34 E |
| 4,168,729 | 9/1979 | Tausigi et al. | 144/34 E |

Primary Examiner—W. Donald Bray
Attorney, Agent, or Firm—Pravel, Gambrell, Hewitt, Kimball & Krieger

[57] ABSTRACT

A cable-supported tree cutting device for use with drag lines and the like provides a tool body having a pair of opposed jaws positioned at one end of the tool body and movable with respect to one another so that the jaws can open and close. An open-ended mouth portion is adapted to receive a tree therebetween to grip or cut same. A counterweight portion of the elongated body generally opposite and spaced from the open mouth is provided and a lifting eye is positioned between the jaws and the counterweight for forming a connection with a flexible cable.

11 Claims, 4 Drawing Sheets

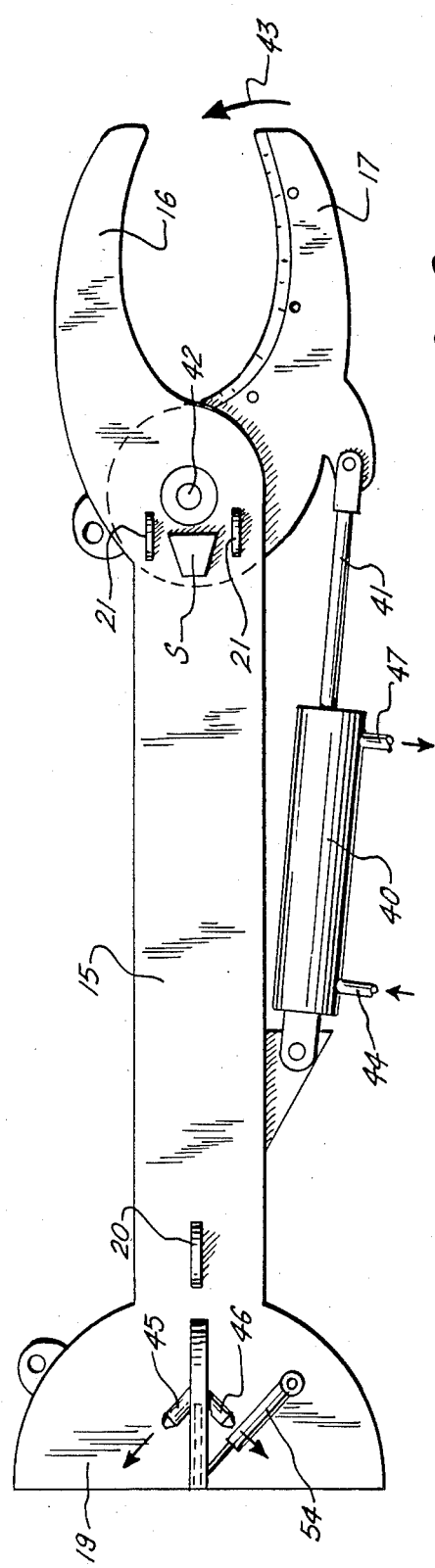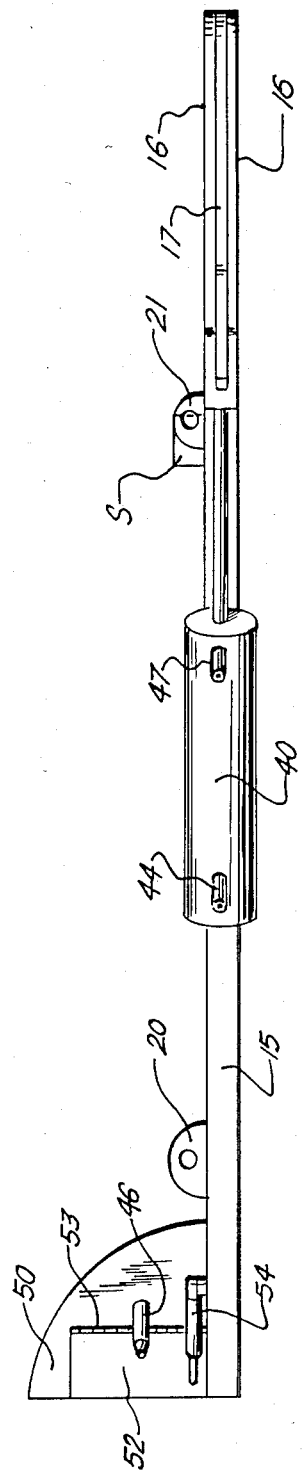
FIG. 2.
FIG. 3.

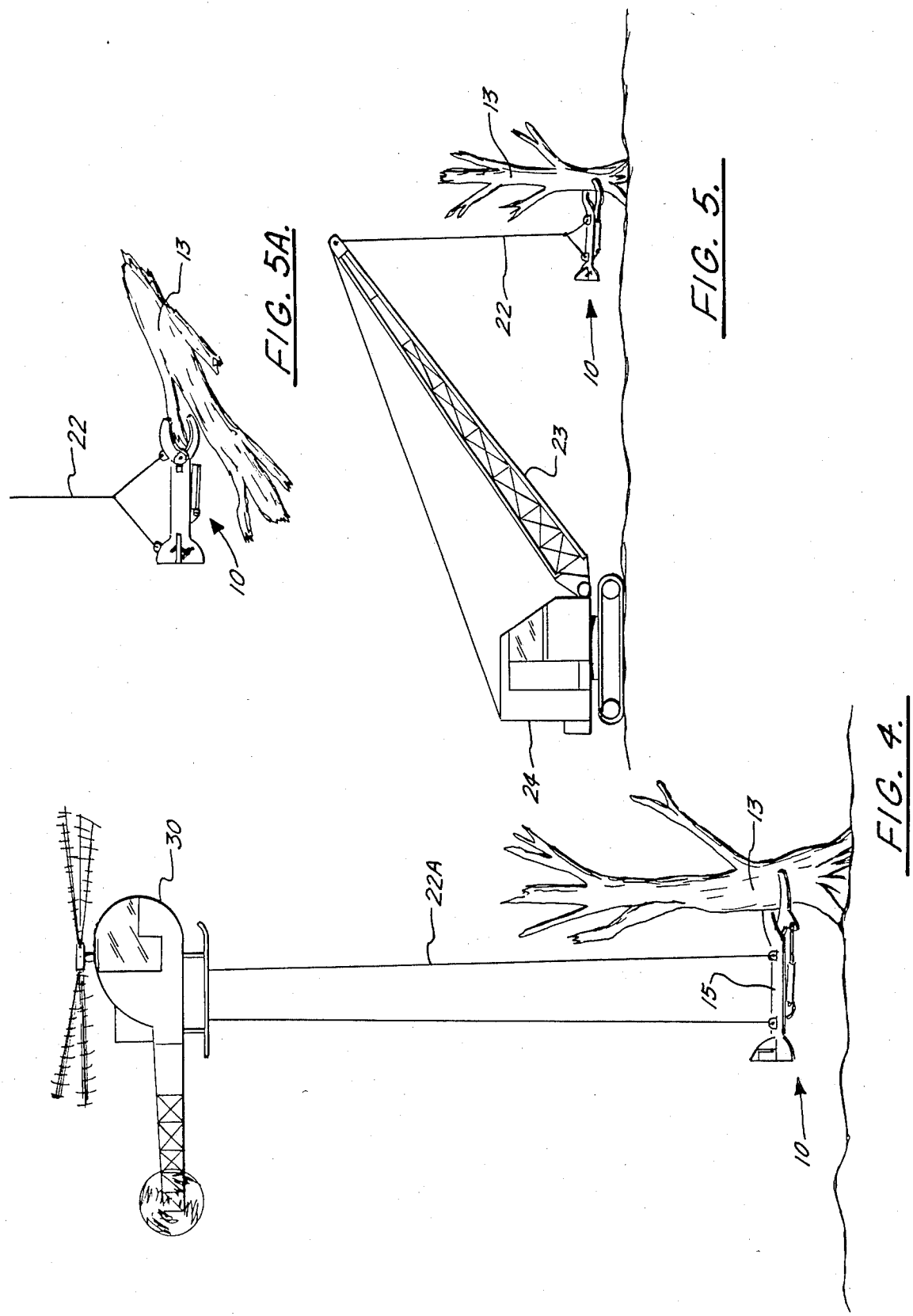

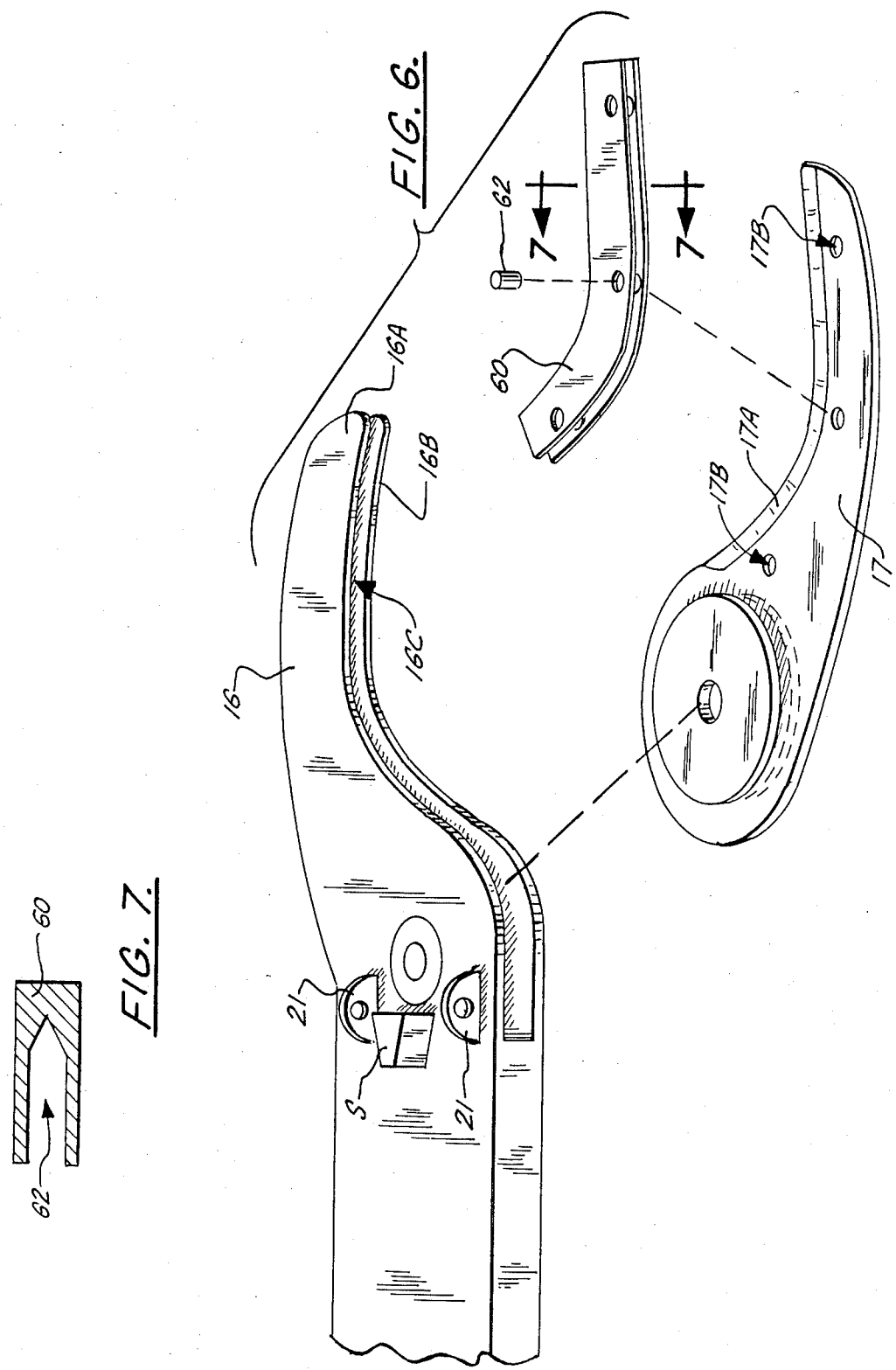

TREE CUTTING APPARATUS

BACKGROUND OF THE INVENTION

1. Field of the Invention:

The present invention relates to draglines and cable-supported cutting devices that can be supported by a cable with a dragline. Even more particularly, the present invention relates to an improved tree cutting device that can be suspended by a dragline lift cable and operated to traverse laterally and engage trees and the like for the purpose of lifting and/or cutting same.

2. General Background

In the clearing of right-of-ways for pipelines, roads and the like, it is common to use cutting devices with jaws which approach and shear the tree at its base. Many of these devices are mounted on backhoes, marsh buggies, swamp buggies and the like. Typically, such a gripping device requires a sophisticated heavy-duty apparatus costing hundreds of thousands of dollars, such as an amphibious backhoe or a backhoe on mats. Such a device typically manipulates the jaws to cut the trees with an extended linked hydraulically operated arm. This apparatus is highly specialized for the purpose of shearing trees and does an effective job. Examples of such devices include commercial units manufactured by Bucyrus Erie, Brott, Caterpillar, and the like. They are known as tree shearing devices, fellor-buncher and similar such terms.

The problem with these prior art devices is not that they are ineffective in shearing the trees and like obstacles. They are very expensive to operate and maintain.

There are a number of lesser expensive lifting devices which are used for a variety of tasks and are more of a multi-purpose type of heavy machinery. For example, a common dragline is simply a boom that is operated from a cabin. The cabin typically has an undercarriage of tracks and one or more winches wound with structurally sound wire rope. The rope is used to both raise and lower the boom as well as to lift cable which is wound upon the boom. Draglines commonly are used to lift heavy objects and to move these heavy objects to a desired location.

One of the most common methods of dredging a canal is to use a dragline and manipulate a relatively inexpensive bucket which can be, for example, a drag bucket or a clam bucket.

A number of devices have been patented which relate to the problem of cutting elongated devices such as trees, pile, and the like.

For example, the Corey U.S. Pat. No. 3,667,515, issued June 6, 1972, entitled "Pile Cutting Device," provides an apparatus that has a base with a guide adapted for receiving a pile, the base being adapted for reciprocal movement with respect to the pile, connectors affixed to the base for suspending the base in a substantially horizontal plane, a blade having a pair of opposite extremities, one of the extremities being pivotably mounted to the base, an actuator having a fixed member and a movable member, the fixed member being pivoted to the base and the movable member being pivotably mounted to the other extremity of the blade, the blade being swept across the guide when the actuator is engaged and being retracted away from the guide when the actuator is disengaged. When the pile cutter is lowered to the base of a pile, the guide being positioned about the pile for restricting the lateral movement of the base with respect to the pile, the actuator is engaged causing the blade to shear the pile at its base.

The Bannister U.S. Pat. No. 2,707,008, entitled "Tree-Handling Method And Airborne Apparatus," provides a gear-driven, cable operated device for cutting trees in remote locations.

The McRee U.S. Pat. No. 3,056,267, entitled "Method And Apparatus For Removing From Submerged Sites Portions Of Previously Driven Piles," discloses of a dragline operated device and a method for removing from submerged sites portions of piles previously driven at their lower end into the water bed and having cap ends exposed above the water line. A frame is used that can be laterally shifted to a position poised above the pile with an opening through the frame in alignment with the cap of the pile. The frame is then lowered, making the frame captive to the pile. The frame is then guided to the mud line and the pile is severed at the mud line.

A forest harvester is the subject of U.S. Pat. No. 3,638,693. The machine described in that patent is intended for separating standing trees. The apparatus is a wheeled A-frame type device that supports an open-ended gripping member.

The Choat U.S. Pat. No. Re. 31,481, entitled "Shear Type Tree Cutting Device," provides an apparatus with an elongated frame including tree clamping jaws supported at one end and a shear-type cutting blade supported from the frame for movement therealong between an inactive position remote from the jaws and an active position cooperative with the jaws to shear a tree member clampingly engaged by the jaws.

A grab-type tree harvester is the subject of U.S. Pat. No. 4,537,236, issued to S. Kulju. A pair of open-ended jaws is used to clamp the tree. A frame is connected to a lifting means through a rotating means in a manner such that the frame is adapted to rotate about a substantially vertical axis. The frame comprises grab means which are selectively moved by actuation means to an opened or closed position. Roller means for pulling a felled tree through the grab means is provided and at least one means for pruning a felled tree.

A hydraulically operated device for cutting trees, logs and the like is the subject of U.S. Pat. No. 3,270,787. That apparatus shows a hydraulic linked arm supported by a tractor with a pair of open-ended jaws at the distal end of the linkage.

SUMMARY OF THE PRESENT INVENTION

The present invention provides a simplified, economical method of cutting trees, even underwater, using a common dragline or like lift cable operating device. The apparatus thus provides a simplified yet effective cable supported tree cutting device for use with draglines and the like. The apparatus includes an elongated tool body with a pair of opposed jaws positioned at one end of the tool body and movable with respect to one another so that the jaws can open and close. An open-ended mouth portion defined by the jaws in an opened position and adapted to receive a tree to grip or cut same is provided. A counterweight portion of the elongated body is generally opposite and spaced from the open mouth. A lifting eye is positioned between the jaws and the counterweight for forming a connection with the cable and means spaced from the lifting eye is provided for moving the body laterally when supported by a vertically extended lift cable.

In the preferred embodiment, the jaws are powered with a hydraulic cylinder.

In the preferred embodiment, there is provided means for stabilizing the body as it traverses laterally in an underwater environment. The movement means is preferably a laterally extended cable that is connected for operation to a dragline cab in the preferred embodiment.

In the preferred embodiment, the means for moving the apparatus laterally can include one or more fluid operated jets mounted on the body.

In the preferred embodiment, the body includes multiple lifting eyes positioned at different positions on the body so that the body can be supported in different attitudes so that, for example, the planar movement of the jaws can be varied from a horizontal plane to a vertical plane. This facilitates cutting upstanding trees as well as cutting logs which are laying on their sides.

In the preferred embodiment, the lifting eye means comprises in part a lifting eye positioned adjacent the counterweight for supporting the body in a generally vertically aligned position wherein the open mouth and the jaws face downwardly when the jaws in an open position.

In the preferred embodiment, the body means is an elongated, generally flat body having horizontal upper and lower, generally parallel, planar surfaces. This facilitates the apparatus approaching very close to the bottom of a seabed, mud line or the like, so that trees, abandoned piling and the like can be cut at the mud line.

A stabilizing means preferably includes one or more fins extending away from the body in the preferred embodiment.

In the preferred embodiment, the jets are water-operated pressurized fluid jets.

In the preferred embodiment, the jaws can be equipped with removable guards which cover blade portions on the jaws so that the jaws can be converted from cutting to gripping operations.

It is an object of the present invention to provide a simple yet effective tree cutting, tree gripping apparatus which can be used with relatively inexpensive heavy equipment, such as draglines and the like.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein:

FIG. 2 is a top plan view of the preferred embodiment of the apparatus of the present invention.

FIG. 3 is a side elevational view of the preferred embodiment of the apparatus of the present invention.

FIG. 4 is a schematic elevational view illustrating use of the preferred embodiment of the apparatus of the present invention during cutting of a tree.

FIGS. 5 and 5A are schematic side elevational views illustrating the cutting of a tree with the apparatus of the present invention suspended from a common dragline.

FIG. 6 is an exploded, perspective, fragmentary view of the preferred embodiment of the apparatus of the present invention illustrating the jaw portions thereof.

FIG. 7 is a sectional view taken along lines 7—7 of FIG. 6.

DETAILED DESCRIPTION OF THE PREFERRED EMBODIMENT

Figure 1:
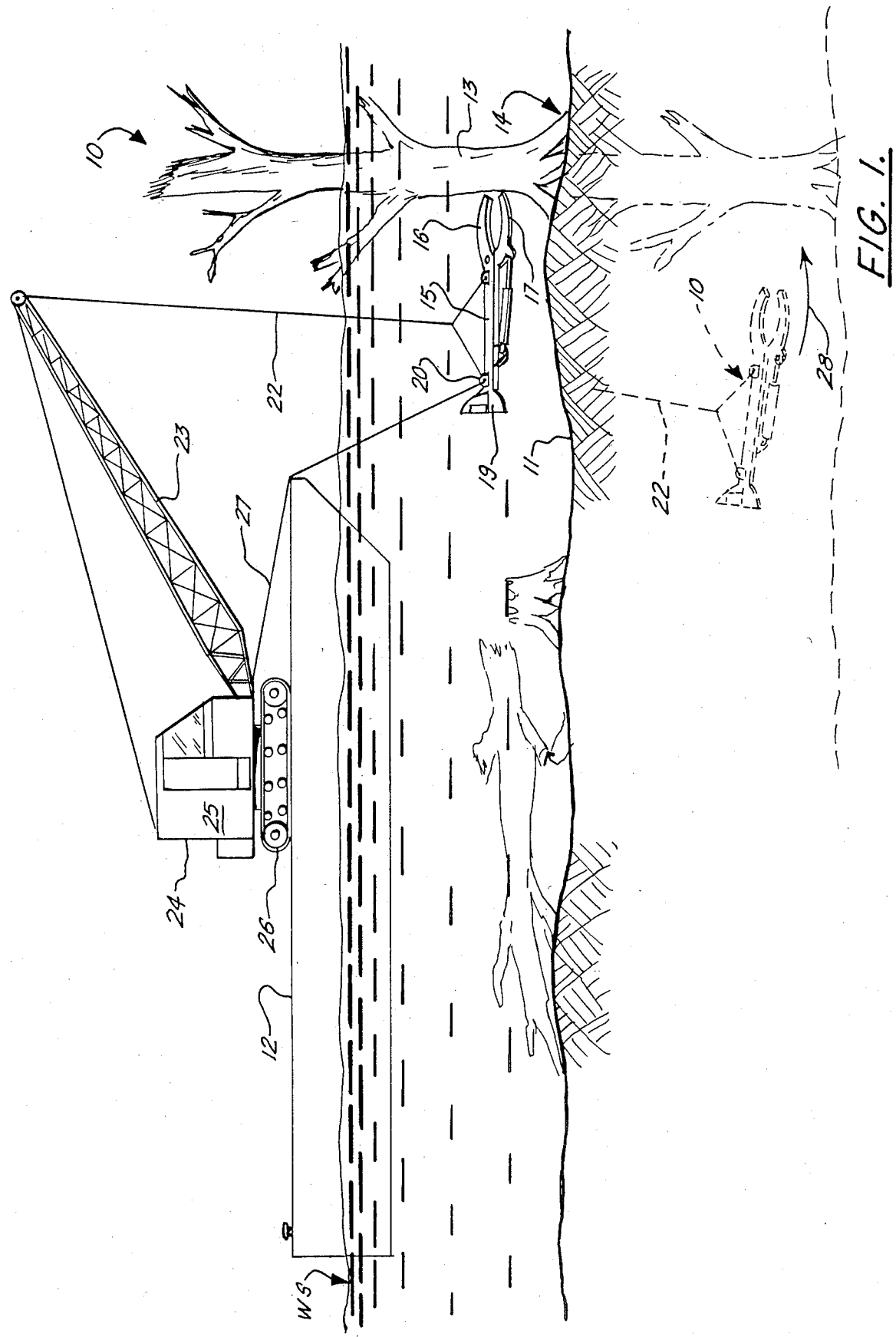
FIG. 1 is a schematic elevational view illustrating the preferred embodiment of the apparatus of the present invention during use.

FIG. 1 illustrates the preferred embodiment of the apparatus of the present invention designated generally by the numeral 10, being used in an aquatic environment. In FIG. 1, a barge 12 is shown supported upon a body of water having a surface WS and a mudline 11. A tree 13 extends upwardly from the mudline 11 at 14. The apparatus 10 includes an elongated tool body 15 which at one end portion carries a pair of opposed jaws 16, 17 which are movable with respect to one another so that the jaws 16, 17 can open and close. The jaws define an open-ended mouth portion 18 adapted to receive a tree to cut or grip same (see FIGS. 4–5). The body can be supported on its side (FIG. 5A) for gripping/cutting horizontally positioned trees 13, logs, or the like.

A counterweight portion 19 of the elongated body 15 is positioned generally opposite and spaced from the open mouth 18. Lifting eyes 20, 21 are provided on the body 15 between jaws 16, 17 and counterweight 19. The lifting eyes 20, 21 provide a point of attachment for a lift cable 22, such as that shown in FIG. 1 being supported by the boom 23 of a conventional dragline 24 having a cab portion 25 with an undercarriage 26 as is well known in the art.

The body 15 can be moved laterally so that the apparatus 10 can be moved to engage a tree trunk, and then be swung to a new position to engage another tree trunk. In one embodiment, the apparatus includes a laterally extending cable 27, such as the cable shown in FIG. 1, which is attached to lifting eye 20. This allows the apparatus to be moved in a lateral fashion with respect to the generally vertical lift line 22, as shown in FIG. 1 (phantom lines) indicated by the Arrow 28. The apparatus can also be used with a helicopter, such as that designated by the numeral 30 in FIG. 4, having a lift line 22A supporting the body 15. Further, a land-based dragline 24 can also operate the apparatus 10, as illustrated in FIG. 5.

As best seen in FIGS. 2 and 3, the jaws 17 can be powered with respect to one another. In the preferred embodiment, a hydraulic cylinder 40 having a pushrod 41 is used to pivot the jaw 17 about pivot 42 between closed and opened positions. The curved arrow 43 in FIG. 2 illustrates the opening and closing of jaw 17 with respect to jaw 16.

A pair of nozzles or jets 45, 46 are provided at the end portion of body 15 opposite jaws 16, 17. In combination with jets 45, 46, the counterweight portion 19 includes an upstanding fin 50 which extends away from body 15, as shown in FIG. 3. The fin 50 includes a movable rudder portion 52 powered by hydraulic cylinder 54 which pivots about hinge 53. Water or air-powered jets 45, 46 could thus be used to move the apparatus forward and in any desired direction. The jets 45, 46 could be powered, for example, with hydraulic, pressurized hoses (not shown) which would communicate with the cab 25 of dragline 24, for example. Similarly, hydraulic fluid could be supplied to cylinder 40 through ports 44, 47 for the purpose of opening and closing jaw 17 with respect to jaw 16.

FIGS. 6 and 7 illustrate a removable kit in the form of gripping attachment 60. The jaw 17 includes a single blade portion while the jaw 16 includes a pair of spaced-apart generally parallel flat blade portion 16A, 16B, with a space 16C therebetween so that during operation the jaw 17 can pass into the space 16C between blade portion 16A, 16B. The jaw 17 includes a cutting edge 17A. A plurality of bolt openings 17B allow a gripping member 60 to be attached by bolting, for example, using bolts or pins 62 to attach the gripping member 60 to blade member 17. In this manner, the cutting edge 17A is covered by the attachment 60 so that the apparatus 10 can grip and hold trees, piles, or the like that have been cut, if desired. The gripping attachment 16 includes an insert portion 62 which conforms generally to the outer configuration of blades 17A and jaw 17.

A sonar apparatus 5 can be installed near pivot 42. Sonar S can be used optionally to help locate trees, logs, and the like in an underwater environment.

In view of the numerous modifications which could be made to the preferred embodiments disclosed herein without departing from the scope or spirit of the present invention, the details herein are to be interpreted as illustrative and not in a limiting sense.

What is claimed as invention is:

1. A cable-supported tree cutting apparatus device for use with draglines and the like comprising:
   (a) an elongated tool body;
   (b) a pair of opposed jaws positioned at one end of the tool body and movable with respect to one another so that the jaws can open and close;
   (c) an open-ended mouth portion defined by the jaws in an open position and adapted to receive a tree to grip or cut same;
   (d) a counterweight portion of the elongated body generally opposite and spaced from the open mouth;
   (e) lifting eye means positioned between the jaws and the counterweight for forming a connection with a cable; and
   (f) means spaced from the lifting eye means for moving the body laterally when supported by a vertically extended lift cable.

2. The apparatus of claim 1, wherein the jaws are powered with a hydraulic cylinder.

3. The apparatus of claim 1, further comprising means for stabilizing the body as it traverses laterally in an underwater environment.

4. The apparatus of claim 1, wherein the moving means is a laterally extended cable connected for operation to the dragline.

5. The apparatus of claim 1, wherein the moving means includes a fluid operated jet mounted on the body.

6. The apparatus of claim 1, wherein the body includes generally flat multiple lifting eye means for supporting the body in different attitudes so that the plane of movement of the jaws can be varied from horizontal to vertical.

7. The apparatus of claim 6, wherein the lifting eye means comprises in part a lifting eye positioned adjacent the counter weight for supporting the body in a generally vertically aligned position, wherein the open mouth of the jaws faces downwardly when the jaws are in an open position.

8. The apparatus of claim 1, wherein the body is an elongated generally flat body having horizontal, upper and lower, generally parallel planar surfaces.

9. The apparatus of claim 3 wherein the stabilizing means includes one or more fins extending from the body.

10. The apparatus of claim 5, wherein the jet is a pressured water operated fluid jet.

11. The apparatus of claim 1, further comprising bit means for converting the jaws from cutting jaws to gripping jaws.

* * * * *